(12) United States Patent  
Zhang et al.

(10) Patent No.: US 11,775,502 B2  
(45) Date of Patent: *Oct. 3, 2023

(54) FACILITATING EFFICIENT AND EFFECTIVE ANOMALY DETECTION VIA MINIMAL HUMAN INTERACTION

(71) Applicant: ADOBE INC., San Jose, CA (US)

(72) Inventors: Wei Zhang, Great Falls, VA (US); Christopher Challis, Alpine, UT (US)

(73) Assignee: Adobe Inc., San Jose, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 17/200,522

(22) Filed: Mar. 12, 2021

(65) Prior Publication Data

US 2022/0292074 A1    Sep. 15, 2022

(51) Int. Cl.
*G06F 16/23* (2019.01)
*G06F 11/34* (2006.01)
(Continued)

(52) U.S. Cl.
CPC ...... *G06F 16/2365* (2019.01); *G06F 11/3452* (2013.01); *G06N 20/00* (2019.01);
(Continued)

(58) Field of Classification Search
CPC . G06F 16/2365; G06F 11/3452; G06N 20/00; H04L 41/145; H04L 41/147; H04L 43/08; H04L 63/1425
(Continued)

(56) References Cited

U.S. PATENT DOCUMENTS 11,392,437 B1 * 7/2022 Zhang ............... G06F 11/3006
2011/0276527 A1 * 11/2011 Pitcher ................ G06F 13/24
703/2

(Continued)

FOREIGN PATENT DOCUMENTS

EP     3913885 A1 * 11/2021 ............ G06F 21/55
TW     M622216 U  *  9/2021

OTHER PUBLICATIONS

Fiore, Ugo, et al. "Network anomaly detection with the restricted Boltzmann machine." Neurocomputing 122 (2013): 13-23. (Year: 2013).*

(Continued)

*Primary Examiner* — Dennis Truong
(74) *Attorney, Agent, or Firm* — Shook, Hardy & Bacon L.L.P.

(57) ABSTRACT

Embodiments of the present technology provide systems, methods, and computer storage media for facilitating anomaly detection. In some embodiments, a prediction model is generated using a training data set. The prediction model is used to predict an expected value for a latest (current) timestamp, which is used to determine that the incoming observed data value is an anomaly. Based on the incoming observed data value determined to be the anomaly or not, a corrected data value is generated to be included in the training data set. Thereafter, the training data set having the corrected data value is used to update the prediction model for use in determining whether a subsequent observed data value is anomalous. Such a process may be performed in an iterative manner to maintain optimized training data and prediction model.

15 Claims, 7 Drawing Sheets

(51) Int. Cl.
  *G06F 11/30* (2006.01)
  *H04L 41/16* (2022.01)
  *G06N 20/00* (2019.01)
  *H04L 41/147* (2022.01)
  *H04L 43/08* (2022.01)
  *H04L 9/40* (2022.01)
  *H04L 41/14* (2022.01)

(52) U.S. Cl.
  CPC .......... *H04L 41/145* (2013.01); *H04L 41/147* (2013.01); *H04L 43/08* (2013.01); *H04L 63/1425* (2013.01)

(58) Field of Classification Search
  USPC ................................. 703/2; 706/21; 709/224
  See application file for complete search history.

(56) References Cited

U.S. PATENT DOCUMENTS

| | | | | |
|---|---|---|---|---|
| 2013/0097103 | A1* | 4/2013 | Chari | G06N 20/10 707/E17.089 |
| 2014/0108640 | A1* | 4/2014 | Mathis | H04L 41/145 709/224 |
| 2019/0129821 | A1* | 5/2019 | Lee | G06F 11/3452 |
| 2020/0097381 | A1* | 3/2020 | Naohara | G06F 17/18 |
| 2020/0177611 | A1* | 6/2020 | Bharrat | H04L 63/1441 |
| 2020/0379868 | A1* | 12/2020 | Dherange | G06F 11/3438 |

OTHER PUBLICATIONS

Akaike, Htrotugu. "Maximum likelihood identification of Gaussian autoregressive moving average models." Biometrika 60.2 (1973): 255-265.

Baldi, Pierre. "Autoencoders, unsupervised learning, and deep architectures." Proceedings of ICML workshop on unsupervised and transfer learning. JMLR Workshop and Conference Proceedings, 2012.

Blume, Moritz. "Expectation maximization: A gentle introduction." Technical University of Munich Institute for Computer Science (2002).

Breunig, Markus M., et al. "LOF: identifying density-based local outliers." Proceedings of the 2000 ACM SIGMOD international conference on Management of data. 2000.

Burrus, C. Sidney. "Iterative reweighted least squares." OpenStax CNX. Available online: http://cnx. org/contents/92b90377-2b34-49e4-b26f-7fe572db78a1 12 (2012).

Ghahramani, Zoubin. "Unsupervised learning." Summer School on Machine Learning. Springer, Berlin, Heidelberg, 2003.

Green, Peter J. "Iteratively reweighted least squares for maximum likelihood estimation, and some robust and resistant alternatives." Journal of the Royal Statistical Society: Series B (Methodological) 46.2 (1984): 149-170.

Hastie, Trevor, Robert Tibshirani, and Jerome Friedman. The elements of statistical learning: data mining, inference, and prediction. Springer Science & Business Media, 2009.

Fattah, Jamal, et al. "Forecasting of demand using ARIMA model." International Journal of Engineering Business Management 10 (2018): 1847979018808673.

Kanungo, Tapas, et al. "An efficient k-means clustering algorithm: Analysis and implementation." IEEE transactions on pattern analysis and machine intelligence 24.7 (2002): 881-892.

Ng, Hong-Wei, et al. "Deep learning for emotion recognition on small datasets using transfer learning." Proceedings of the 2015 ACM on international conference on multimodal interaction 2015.

Taylor, Sean J., and Benjamin Letham. "Forecasting at scale." The American Statistician 72.1 (2018): 37-45.

Torrey, Lisa, and Jude Shavlik. "Transfer learning." Handbook of research on machine learning applications and trends: algorithms, methods, and techniques. IGI global, 2010. 242-264.

Ledolter, Johannes. "The effect of additive outliers on the forecasts from ARIMA models." International Journal of Forecasting 5.2 (1989): 231-240.

2018 reform of eu data protection rules, https://ec.europa.eu/commission/sites/beta-political/files/data-protection-factsheet-changes_en.pdf.

* cited by examiner

200 api_monitor APP  5:52 AM

EA76ADE95776D2EC7F000101@AdobeOrg

Abnormal usage on 2020-07-23 —202

204—{"Jobs Count": {"Expectation": "20963.68", "Observation": 66972, "Spike severity": "4.98"}}

If metric *Jobs Count* is not anomalous, please click: http://alertingfeedbackmanager-dev-va6.stage.cloud.adobe.io/alertingfeedbackmanager/processfeedback?
206—feedbacks=%7B%22Jobs+Count%22%3A+%22normal%22%7D&projectName=gdpr&date=2020-07-23&publisher=EA76ADE95776D2EC7F000101%40AdobeOrg

FIG. 2

FACILITATING EFFICIENT AND EFFECTIVE ANOMALY DETECTION VIA MINIMAL HUMAN INTERACTION

BACKGROUND

Generally, to accurately train a model (e.g., a predictive model), an accurate training data set is desired. In this regard, it is generally desired that the training data set used to train a model is void of any data anomalies. Identifying data anomalies, however, can be inefficient and error prone. In particular, in conventional implementations, individuals can review the data and manually label data as anomalies or outliers such that the anomaly labeled data is not used for training a model (e.g., predictive model). Manually reviewing and annotating such data is labor intensive and error prone, particularly in relation to an extensive amount of data.

SUMMARY

Embodiments described herein relate to facilitating efficient and effective automated anomaly detection. In particular, to efficiently and effectively detect anomalies, embodiments herein optimize and/or update a training data set for use in generating data models, such as prediction models (e.g., a time series prediction model). By optimizing the training data set used to generate data models, the data models are also optimized to perform more accurate data prediction. Generally, in optimizing the training data set, embodiments described herein are directed to removing anomalies from the training data set in an effort to use an anomaly free data set to generate data models. In particular, embodiments provided herein, detect and remove or correct anomalies in an automated manner. Further, user feedback can be provided to indicate when a false anomaly is detected, that is, the so-called detected anomaly is believed to actually be a normal data value. Such user feedback is provided in a simple manner (e.g., one-click manner) and in a limited amount.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 2 is an example of an anomaly alert, in accordance with one embodiment of the present disclosure;

DETAILED DESCRIPTION

Figure 1:
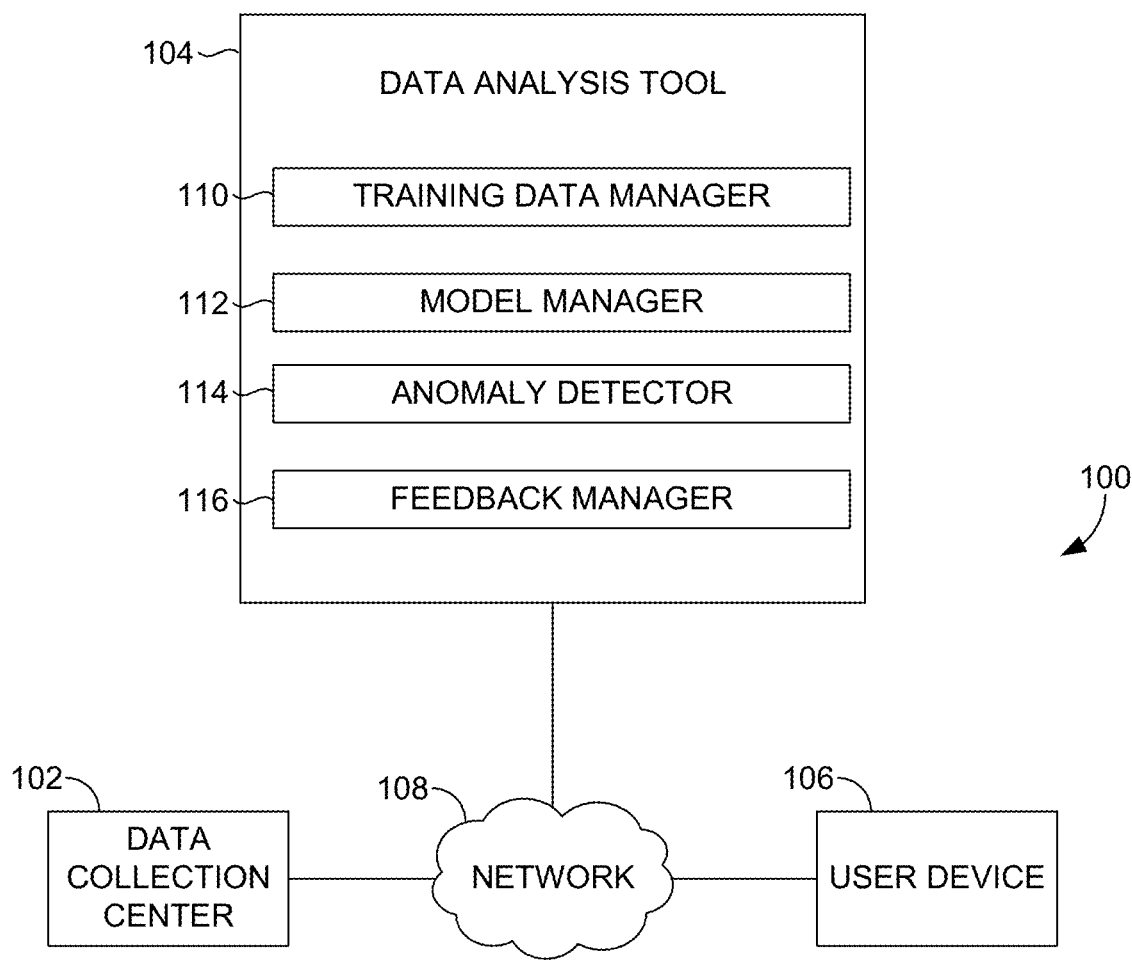
FIG. 1 is a block diagram of an exemplary system architecture in which embodiments of the present disclosure may be employed.

The subject matter of the present technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Data is often collected as a time series data set, that is, a sequence of data points, typically including successive measurements made over a time interval. Time series data is frequently utilized to perform a predictive or forecasting data analysis. In this manner, time series data can be used to generate a prediction model for use in predicting or forecasting data expected to result at some point in the future. Algorithms for time series forecasting can have many forms. For example, to perform time series forecasting, various algorithms related to autoregressive (AR), moving average (MA), autoregressive moving average (ARMA), and autoregressive integrated moving average (ARIMA) can be implemented to infer prediction models from collected time series data. Such prediction models can then be used predict data associated with any number of future time intervals. For example, prediction models can be used to monitor and predict memory usage, data throughput, data loss, API usage, etc.

Oftentimes, a time series data set includes anomalies or outliers. Generally, such anomalies or outliers is an observation that does not conform to the normal or expected behavior. For example, an anomaly may be a sudden throughput drop or latency spike of data center data or an unusually high CPU or memory load in a server. To generate an accurate prediction model, it is typically desired to identify and remove the anomalies from the training data. By removing anomalies from training data used to train or generate a prediction model, the model can be trained to more accurately predict or forecast data. In addition to anomalies being undesired for use in generating prediction models, such data can also indicate a potential issue or problem, such as a server failure, a data center-wide issue, catastrophic data loss, or the like. In addition to anomalies indicative of infrastructure issues, anomalous events may occur at the service level (e.g., agreement compliance, etc.).

Generally, users desire to be informed of anomalous events, such as infrastructure anomalies and service-level anomalies. For instance, in cases in which an unexpected event has occurred, a user may desire to be alerted or notified such that the user can address or resolve any issues that occurred or may occur. As such, anomaly detection is valuable to users in many contexts. Identifying data anomalies, however, can be inefficient and error prone.

For example, in some conventional implementations, anomaly thresholds are manually set by users for use in detecting anomalous events. For instance, a user may set an anomaly threshold related to particular metric of interest and, if exceeded, the user is to be alerted to the anomalous event. Manually establishing anomaly thresholds, however, can be tedious and time consuming. In particular, manually setting thresholds can require a deep understanding of system behaviors as it is difficult to set proper thresholds without in-depth domain knowledge. Further, manually setting thresholds does not efficiently scale, which is valuable given the increasingly growing number of services and metrics which would have their own corresponding anomaly thresholds and which may need to change over time (e.g., as systems or services evolve). In addition to requiring a deep system understanding and scalability issues, manually established anomaly thresholds can have difficulties in handling natural data variations (e.g., seasonality). By way of example only, setting one anomaly threshold can result in missing a significant drop during peak hour or provide a false alarm in other time periods.

Additionally or alternatively, in some conventional implementations, machine learning is performed to facilitate anomaly detection. In particular, an algorithm (e.g., ARIMA) is used on historical data (e.g., training data) to build a model, which can be used to predict an expected value and range. To build an accurate model, anomalies within the training data can be removed. To do so, in these conventional implementations, individuals review the data and manually label data as anomalies or outliers such that the anomaly labeled data is not used for training a model (e.g., predictive model). Manually reviewing and annotating such data is labor intensive, particularly in relation to an extensive amount of data.

As such, embodiments described herein are directed to facilitating efficient and effective automated anomaly detection. In particular, to efficiently and effectively detect anomalies, embodiments herein identify and implement an optimal or a quality training data set for use in generating data models, such as prediction models (e.g., a time series prediction model). By optimizing the training data set used to generate data models, the data models are also optimized to perform more accurate data prediction. Generally, in optimizing the training data set, embodiments described herein are directed to removing anomalies from the training data set in an effort to use an anomaly free data set to generate data models. In particular, embodiments provided herein, detect and remove or correct anomalies in an automated manner.

Further, user feedback can be provided to indicate when a false anomaly is detected, that is, the so-called detected anomaly is believed to actually be a normal data value. Such user feedback is provided in a simple manner (e.g., one-click manner) and in a limited amount. Advantageously, utilizing user feedback enables incorporation of user domain knowledge, thereby enabling adaptation to data from different sources. For instance, different data have different characteristics, such as range, smoothness and seasonality. A particular data pattern may be considered anomalous for one domain (source of data), but not for another domain. In addition to enabling incorporation of user domain knowledge, utilizing user feedback reduces or eliminates the need for human labeling of training data.

In operation, the training data and model is updated iteratively utilizing user feedback. Over time, less anomalies are included in the training data such that anomaly free training data is used to build an accurate model. In some implementations, a training data set is initially cleaned to remove any extreme outliers. The cleaned training data set can then be used to generate a prediction model in association with an incoming observed data value. The prediction model can then be used to predict an expected value that corresponds with a time of the observed data value. By comparing the expected value with the observed value, a determination of whether the observed value is an anomaly can be made. In cases that an anomaly is detected, the observed value can be corrected or adjusted such that the anomalous data value is not included in the training data set. Further, an anomaly alert can be provided to a user indicating that the observed data value is designated as an anomalous value. In cases that the user disagrees that the observed data value is anomalous, the user can provide such feedback, which can then be used to further clean the training data set. For instance, the corrected value represented in the training data set can be replaced with the observed data value as the observed data value is considered normal and, as such, desirable for use in generating an accurate prediction model.

Having briefly described an overview of embodiments of the present technology, an exemplary operating environment in which embodiments of the present technology may be implemented is described below in order to provide a general context for various aspects of the present technology. Referring initially to FIG. 1 in particular, an exemplary operating environment for implementing embodiments of the present technology is shown and designated generally as system 100. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 may include a data collection center 102, a data analysis tool 104, and a user device 106. It should be understood that the system 100 shown in FIG. 1 is an example of one suitable computing system architecture. Each of the components shown in FIG. 1 may be implemented via any type of computing device, such as computing device 600 described with reference to FIG. 6, for example. The components may communicate with each other via a network 108, which may include, without limitation, one or more local area networks (LANs) and/or wide area networks (WANs). Such networking environments are commonplace in offices, enterprise-wide computer networks, intranets, and the Internet.

It should be understood that any number of data collection centers, predictive analysis tools, and user devices may be employed within the system 100 within the scope of the present technology. Each may comprise a single device or multiple devices cooperating in a distributed environment. For instance, the predictive analysis tool 104 may be provided via multiple devices arranged in a distributed environment that collectively provide the functionality described herein. As another example, multiple data collection centers 102 may exist, for instance, to be located in remote locations, to increase storage capacity, or to correspond with distinct information (e.g., a separate data collection center for separate websites). Additionally, other components not shown may also be included within the network environment.

The data collection center 102 is generally configured to collect observed data. The data collection center 102 may collect data from any number of data sources and any type of data sources. In some cases, the data sources generally include any computing environment presence at which computer processing occurs or can be detected. In such cases, the data collection center 102 may access data from a server(s) (e.g., such as a web server providing a website(s), a server producing or obtaining data logs) and/or from a client device(s) (e.g., at which a website(s) is being browsed or navigated). As can be understood, the data collection center 102 can contain any amount of numerical data including raw or processed data. The collected data is stored in a storage area, such as a database, for reference by the data analysis tool 104. Any and all such variations of data sources and data associated with the data collection center 102 are contemplated to be within the scope of embodiments of the present technology.

The data collection center 102 may obtain data, for example, in real time as the data is generated by a data source. Alternatively or additionally, the data collection center 102 may collect data on a periodic basis. For example, a data source may post or provide data on a periodic basis (e.g., hourly, daily, etc.). As another example, the data collection center 102 may retrieve data from a data source on a periodic basis. In accordance with embodiments described herein, the data collection center 102 can collect time series data. Time series data generally refers to data captured as a sequence of data points, typically including successive measurements made over a time interval. Time series data can be captured in any number of manners, in any type of format, and in association with any time periods.

Embodiments described herein generally refer to collecting time series data related to web usage, infrastructure (e.g., data centers) usage or data, service-level usage or data, or the like. In this regard, a variety of data can be measured including the type of browser being used, links selected on a particular web page, conversions, CPU or memory usage, network traffic, agreement compliance, etc. By way of example only, a data collection center 102 associated with a data analysis tool is used to collect a large amount of data, which may include data associated with any number of web services or sites, or computing infrastructure performance and usage data (e.g., including any number of machine, servers, virtual machines, data stores, etc.). As the amount of data available may be extremely large, it may be impractical or burdensome to collect and/or analyze such data. As such, a data collection center 102 associated with a predictive analysis tool can collect various data.

Such a large amount of data may result, in part, from numerous data sources providing data. For example, various data sources may provide a data collection center 102 with data describing various metrics of interest. Each data source may be a server, machine, virtual machine, or a client device capable of providing data, for example, via a network.

As can be appreciated, the data provided to the data collection center 102 from various data sources can be associated with any number of web sites, servers, organizations, etc. For instance, in some cases, each of the data sources might provide data associated with a particular organization or entity. In other cases, the data sources might provide data associated with multiple organizations or entities. While embodiments are generally described herein in reference to a web analytics environment or computing infrastructure analytics environment, data collection may occur in any number of environments. Irrespective of the environment, the data collection center 102 can collect data from any number of data sources and in any manner.

With continued reference to FIG. 1, the data analysis tool 104 is configured to facilitate anomaly detection, as described in more detail below. Although the predictive analysis tool 104 is shown as a separate component, as can be understood, the predictive analysis tool 104, or a portion thereof, can be integrated with another component, such as a data collection center, user device, or the like. For instance, in one embodiment, the predictive analysis tool 104 is implemented as part of a server or other hardware or software component, or it can be implemented as a software module running on a conventional personal computer, for example, that is being used for data analysis.

The data analysis tool 104 can perform data anomaly detection in real-time (e.g., as data is obtained at the data analysis tool 104), in a batch methodology (e.g., upon a lapse of a time duration), or upon demand when a request is made for anomaly detection or predictive analysis. By way of example only, in some cases, the data analysis tool 104 automatically initiates anomaly detection, for instance, based on expiration of a time duration, upon recognition of new data, or the like. As another example, a user operating the user device 106 might initiate anomaly detection and/or data forecasting, either directly or indirectly. For instance, a user may select to predict data within a time period to initiate anomaly detection and/or predictive value determination. Alternatively, a user may select to view anomalies or predictive data analysis, for example, associated with website usage, thereby triggering the data analysis tool to perform anomaly detection and/or predictive values generation.

As shown in FIG. 1, the data analysis tool 104 includes, among other things not shown, a training data manager 110, a model manager 112, an anomaly detector 114, a feedback manager 116, and a data store 118. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The data store 118 is generally accessible to components of the data analysis tool 104. In this regard, various components may store data to, or access data from, the data store 118. Data store 118 may include any type of data in relation to the data analysis tool 104. By way of example only, and as described in more detail below, the data store 118 may include observed data, predicted or expected data, training data, or the like.

The training data manager 110 is generally configured to manage training data for use in generating or updating a model (e.g., a prediction model). In operation, the training data manager 110 can obtain observed data or raw data, for example, from the data collection center 102. As described, the observed data can be time series data. In some cases, although generally referred to as observed or raw data, in some cases, the data may be processed data.

Data can be obtained or referenced in any manner including, receiving the data, retrieving the data, or otherwise accessing the data, for example, from the data collection center 102 or other data sources. Further, any amount of data can be obtained. For example, in some cases, all of the data within the data collection center 102 might be referenced. In other cases, a portion of the data within the data collection center 102 might be referenced, such as data associated with a particular metric, entity, service, or website; data collected since a previous data analysis was performed; data collected or corresponding with a particular time frame; or the like. Although the data collection center 102 is illustrated as remote from the data analysis tool 104, such data can be integrated or directly accessible from the data analysis tool 104 (e.g., via a direct connection).

Data may be obtained by the training data manager 110 on a real-time basis, a periodic basis, or the like. In this way, the training data manager 110 may receive data from the data collection center 102 as the data collection center 102 obtains the data (e.g., in a real time or streaming manner). In other cases, the training data manager 110 may receive or retrieve data from the data collection center 102 on a periodic basis. For instance, the data collection center 102 may transmit data on a periodic basis (e.g., daily basis, hourly basis, weekly basis, etc.). As another example, the training data manager 110 may retrieve data from the data collection center 102 on a periodic basis.

As described, in embodiments, the obtained data is represented as a data set in the form of time series data. Based on a metric, type, and/or time period associated with expected data values, a particular data set can be identified and used to generate a corresponding prediction model. A particular data set might be referenced based on an interest of an expected value. For example, assume a user is interested in page views for the next week. In such a case, page view data associated with the previous 52 weeks can be obtained as a data set.

As the data is obtained (e.g., a data point or set of data), the training data manager 110 may store the data as observed data O in data store 118. In embodiments, the training data manager 110 may store the data in the data store in a time series sequence. As such, the observed data may be stored or accumulated in sequence corresponding with the time stamp associated with the observed data. The observed data may be stored in any number of ways, such as a data vector including the sequence of observed data. Such data may be stored in an on-going basis as the data is obtained or in a batch basis, for example in cases in which data is obtained in a batch or data set. Incoming observed data can be appended to the observed data O in the data store 118.

The training data manager 110 can generate a set of training data using the observed data. In this regard, the training data manager 110 may analyze the observed data to generate a training data set $\tilde{X}$. A training data set, or set of training data, generally refers to the set of data used to generate a model, such as a predictive model. As previously described, the observed data may include various anomalies. As such, the training data set $\tilde{X}$ is generally intended or desired to exclude such anomalies from the data for use in generating a more accurate model.

To generate a training data set, the training data manager 110 may identify and remove extreme or isolated anomaly data points from the observed data set. In this way, the training data manager 110 can analyze observed data to determine whether the observed data is an extreme or isolated outlier. If a particular observed data point is determined to be an extreme outlier, the observed data point is excluded from the training data set.

In identifying extreme outliers, a set of observed data may be analyzed. Any of the observed data O obtained by the training data manager 110 may be analyzed. In embodiments, a particular amount of observed data can be referenced (e.g., from the data store 118 and/or the data collection center 102). In some cases, the particular amount of observed data may be a preset or default amount (e.g., customized or specified by a user). Generally, a particular amount of observed data includes enough data to be able to recognize a pattern in the data (e.g., seasonality, etc.). A particular amount of observed data may be a number of data points, data points associated with a particular number of days or other time metric, or the like. For instance, in some cases, a default amount of observed data to obtain may be observed data associated with the last 28 days. Such a default amount may be customized, for example, by users based on the nature of the data (e.g., 14 day time frame associated with throughput data collected every 5 minutes). As another example, a target number of data points may be obtained. A target number of data points N may be determined based on a minimal time coverage and data frequency. Such a minimal time coverage of training data may be a default or customized time frame. For example, assume a 14-day minimal coverage of training data collected every five minutes is desired. In such a case, the target number of data points N equals (14 days times 24 hours times 60 minutes divided by 5 minutes, which results in a target number of 4,032 data points). In such a case, 4,032 data points (e.g., most recent data points) can be referenced for use in identifying extreme outliers.

To determine extreme outliers, the obtained observed data set (e.g., 4,032 data points) can be analyzed to identify a mean and standard deviation of the data set. In some cases, the obtained observed data set (e.g., 4,032 data points) may be reduced or filtered for use in determining the mean and standard deviation. For example, of the obtained observed data set (e.g., 4,032 data points), the top 5% and bottom 5% of the data points may be removed or filtered out in determining the mean and standard deviation. Removing some of the data points (e.g., top 5% and bottom 5% from the observed data set to determine the mean and standard deviation can affect or suppress the impact of extreme outliers.

In accordance with determining the mean and standard deviation of the data set, such data can be used to identify the extreme outliers. In embodiments, a control parameter may be used to identify extreme outliers. A control parameter may indicate a bound(s) (e.g., upper and lower bound) for assessing or determining whether a data point is an extreme outlier. In this regard, a control parameter may indicate a number of standard deviations to use for assessing or determining whether a data point is an extreme outlier. A control parameter may be any numeral. In some embodiments, a control parameter is four indicating four standard deviations from the mean is used to identify extreme outliers. As such, in this case, if a data point value is less than the mean minus four standard deviations or the data point value is greater than the mean plus four standard deviations, the data point value is identified as an extreme outlier.

A desirable control parameter may be one that enables exclusion of extreme or substantially likely outliers, but not exclusion of data points that may indicate data patterns. For example, the smaller the control parameter, the more likely that extreme values will be discarded. However, as real data can be very spiky, for example due to seasonalities, normal data values (e.g., in peak time) might also be removed for a small control parameter. Advantageously, using an appropriate control parameter (e.g., four) to facilitate extreme outlier identification enables exclusion of extreme outliers, or data almost certain to be anomalies, from the training data such that the model can be trained more accurately. On the other hand, maintaining such extreme outliers in the training data would more likely result in a skewed or inaccurate model thereby impacting the model performance. As such, using an appropriate control parameter can facilitate model quality in a restrained manner.

Excluding extreme outliers from training data set $\tilde{X}$ may occur in a number of ways. In some cases, the training data set may include all the observed data points and, upon identifying extreme outliers, such extreme outliers can be removed from the training data set $\tilde{X}$. In this regard, the training data initially includes the observed or raw data, which is cleaned or updated to remove extreme outliers. As another example, as each observed data point is analyzed to identify whether it is an extreme outlier, the observed data point can be added or appended to the training data set $\tilde{X}$ when the observed data point is not identified as an extreme outlier. On the other hand, when an observed data point is identified as an extreme outlier, the observed data point is not added to the training data set $\tilde{X}$.

One example algorithm that may be used by the training data manager 110 is provided below. As described below, observed data is accumulated until N target data points are obtained. In this example, the observed data set is $O = O_0, O_1, \ldots O_{N-1}, O_i = \{t_i, d_i\}$, wherein $t_i$ is the time stamp for the $i^{th}$ data point and $d_i$ is the data value for the $i^{th}$ data point.

Algorithm 1

1. Given O, extract $V = d_0, d_1, \ldots d_{N-1}$, V is the vector of data values.
2. Sort V, remove the top 5% and bottom 5% entries, denote the remaining as $\tilde{V}$.
3. Calculate the mean $\mu$ and standard deviation $\sigma$ of $\tilde{V}$.
4. For each $O_i$; $i = 0, 1, \ldots N-1$:
if $d_i < \mu - \sigma * \tau$ or $d_i > \mu + \sigma * \tau$, then remove $O_i$ from O.

As described, this is only one example implementation and is not intended to limit the scope of embodiments described herein.

The model manager 112 is generally configured to manage models, such as prediction models. In this regard, the model manager 112 can facilitate generation of models and/or implementation of models to predict outcomes. With regard to generating a model, the model manager 112 can use collected data, such as the training data set $\tilde{X}$, to generate or update a model. As such, the model manager 112 can operate to reference data, for example, from the training data manager 110, the data store 118, or the like. Data can be referenced in any manner including, receiving the data, retrieving the data, or otherwise accessing the data. Further, any amount of data can be referenced. For example, in some cases, all of the training data set within the data store 118 might be referenced. In other cases, a portion of the training data within the data store 118 might be referenced, such as data associated with a particular entity, service, or website; data collected since a previous data analysis was performed; data collected or corresponding with a particular time frame; or the like.

Generally, the referenced data is represented as a data set in the form of time series data. Based on a metric, type, and/or time period associated with expected data values, a particular data set can be identified and used to generate a corresponding prediction model. A particular data set might be referenced based on an interest of an expected value. For example, assume a user is interested in a computing performance metric for the next week. In such a case, a training data set associated with computing performance from the previous 52 weeks can be obtained and used to generate a prediction model.

As described, in embodiments, a training data set is used to generate a model. As described, an initial training data set $\tilde{X}$ includes observed data with extreme outliers removed (e.g., via Algorithm 1 described above). In some cases, the particular training data set to use may correspond with the training data set generated, via the training data manager 110, in association with excluding extreme outliers. By way of example only, assume a target number of data points N are analyzed by the training data manager 110 to identify extreme outliers. In such a case, the same set of data points, with the extreme outliers removed, can be used to generate and/or update the model.

In accordance with generating a model, the model manager 112 may use the model to predict outcomes or expected values. In some cases, the model manager 112 may predict a future outcome or expected value, that is, an outcome that corresponds with a future time. Such a predicted future value may be stored, used for analysis, and/or provided to a user device.

Additionally or alternatively, the model manager 112 may predict an outcome or expected value associated with a current or previous time. In this regard, assume a new data point corresponding with a current or recent time is obtained at the data analysis tool 104. In such a case, the trained predictive model may be used predict a value expected to occur at the current or recent time. Predicting an outcome or expected value associated with a current or previous time can be used to identify anomalies in data, as described in more detail below.

In accordance with predicting outcomes or expected values, the predicted value(s) can be stored, for example in data store 118, in a predicated data set P. The predicted data set generally refers to a set of predicted values (e.g., a vector of values). As such, upon the model manager 112 identifying or determining a predicted value p at a time t, the predicted value can be appended to a set of predicted values P in the data store 118.

In addition to predicting an expected value, the predictive model can be used to predict an interval or range corresponding with the expected value. For example, the predictive model may also output an upper and lower bound associated with the expected value indicating a confidence of the expected value.

Generation and/or execution of the model can be performed based on an occurrence of an event. For example, in accordance with obtaining an incoming data point (e.g., having a value and a timestamp), the model manager 112 may generate a prediction model using a training data set and, thereafter, use the prediction model to predict an expected value that corresponds with the timestamp of the incoming data point. In other cases, generation and/or execution of the model may occur based on a user selection or input, upon a lapse of a time duration, or the like.

The anomaly detector 114 is generally configured to detect anomalies in data. In this regard, the anomaly detector 114 can determine whether a value associated with time t is an anomaly. To do so, the anomaly detector 114 generally compares a predicted value to a corresponding observed value to identify whether the observed value is an anomaly.

In embodiments, the anomaly detector 114 uses an anomaly threshold to identify whether the observed value is an anomaly. An anomaly threshold may be of any value and may be a default value or customized (e.g., by a user). In some embodiments, an anomaly threshold is three times the standard deviation from the predicted value. As such, if an observed value is outside of three times the standard deviation from the predicted value, the observed value is designated as an anomaly. Stated differently, if an observed value is within three standard deviations from a predicted value, the observed value is deemed a natural variation. As can be appreciated, other anomaly thresholds may be used to detect anomalies and examples provided herein are not intended to limit the scope of the present technology.

As can be appreciated, in accordance with determining a data point is an anomaly, an alert or notification can be provided to indicate the identified anomaly. By way of example only, an alert or notification identifying the data anomaly may be provided to a user device, such as user device 106, to notify a user of a detected anomaly. One example of an anomaly alert 200 is illustrated in FIG. 2. The anomaly alert 200 includes a time 202 associated with the anomaly. The anomaly alert 200 also includes anomaly data 204 associated with the anomaly. Anomaly data can include any data that may indicate the anomaly. In this example, the anomaly data 204 includes an indication of the metric "Jobs Count," an expected value of "20963.68," an observed value "66972," and an anomaly measure of "4.98" (indicating spike severity). As can be appreciated, other types of anomaly data may alternative or additionally be provided to indicate the anomaly. In addition, the anomaly data 204 includes alert feedback indicator. An alert feedback indicator generally refers to a mechanism or tool that enables a user to provide feedback related to the anomaly alert. In this case, the alert feedback indicator includes a link to be selected in cases that the user believes the detected anomaly is not actually anomalous. In this regard, if the user views the alert data and, for any reason, does not believe that the data is anomalous, the user may select the link to provide such an indication. Although this example includes an alert feedback indicator intended to be used when the data is believed to be inaccurate, in other cases the feedback indicator may be used to confirm the accuracy of the alert. In yet other cases, one feedback indicator may be used to confirm the accuracy of the alert, while another feedback indicator is used to indicate an inaccurate anomaly detection. Further, a feedback indicator may be in any of a number of formats, such as, for example, a link, a button, an icon (e.g., thumbs up or thumbs down), etc.

In addition to providing an anomaly alert when an anomaly is detected, the anomaly detector 114 may be configured to correct, update, or modify the identified anomalous value. In this way, the anomaly detector 114 may determine a new value to use in place of the observed value in the training data set. Correcting or updating data values in the training data set when identified as anomalous data enables a more accurately trained data model.

Determining a new or corrected value may occur in any number of ways. As one example, a data value detected as anomalous may be corrected based on a corresponding predicted value. In this regard, the anomaly detector may correct the anomalous data point using a predicted value that is skewed, altered, or drifted toward the observed value. Stated differently, the corrected value is pulled toward the observed value by the value of a standard deviation, meaning the corrected data value is between the observed data value and the predicted data value.

As one example implementation, the anomalous value may be replaced with a value of the predicted value plus or minus a standard deviation, depending on a direction of the anomalous value. For example, a sign (e.g., positive or negative) of the standard deviation may be determined by subtracting the predicted value from the observed value (e.g., the anomalous observed value). In cases in which the predicted value is less than the observed value, the standard deviation remains a positive value and is added to the predicted value. In cases in which the predicted value is more than the observed value, the standard deviation sign is negative, and, therefore, substracted from the predicted value. More specifically, if the observed value is out of the predicted range and therefore identified as an anomaly, the equation p+sign (v−p)*$\sigma_i$ can be used to update the training data for the anomalous data point. Any number of other configurations may be employed to correct or update data values (e.g., use of a predicted value, use of another factor of standard deviation, etc.).

In cases that the anomaly detector 114 determines a data value (e.g., an incoming observed value) is an anomaly and, as such, generates a corrected or updated data value, the anomaly detector 114 may add the updated data value to the training data set $\tilde{X}$. In some cases, the incoming observed value may already be included in the training data set (e.g., via the training data manager 110 or the model manager 112). In such cases, the anomaly detector 114 need not append the updated value to the training data set, but may replace the corresponding observed data point with the corrected data value.

In other embodiments, the anomaly detector 114 may exclude the determined anomaly data value from the training data set (rather than correcting the anomaly data value). In this regard, the anomalous data value may be removed from the training data set $\tilde{X}$ if already included in the data set, or otherwise not be included in the training data set $\tilde{X}$.

On the other hand, in cases that the anomaly detector 114 determines that a data value (e.g., an incoming observed value) is not an anomaly, the anomaly detector 114 may add the observed value to the training data set $\tilde{X}$. In some cases, the incoming observed value may already be included in the training data set $\tilde{X}$ (e.g., via the training data manager 110 or the model manager 112). In such cases, the anomaly detector 114 need not append the observed value to the training data set $\tilde{X}$.

In some embodiments, the anomaly detector 114 may also append or add the predicted value to the predicted data set P, if not already performed (e.g., via the training data manager 110 or the model manager 112).

One example algorithm for implementing aspects of the training data manager 110, the model manage 112, and/or the anomaly detector 114 is provided below, shown as Algorithm 2. In this example algorithm, the sequence of the original (raw) data points is denoted as O. $O_i=(t_i, v_i)$ represents the data point at the $t_i$ timestamp, e.g. "2019-05-21 02:00:00". $t_0 < t_1 < \ldots < t_i$ is the sequence of timestamps, and $v_i$ is the raw data value. The sequence of predicted data is denoted as P. $P_i=(t_i, p_i)$, $p_i$ is the predicted value at the $t_i$ timestamp. $P_i$ is estimated based on the forecasting model, which is built using the training data before the $t_i$ timestamp. Any time-series forecasting method (e.g. ARMA and ARIMA) can be applied for building models and forecasting future values. The training data is denoted as $\tilde{X}$. $\tilde{X}_k=(t_i, m_i)$ represents the training data at the $t_i$ timestamp, and $m_i$ is the expected value of normal data at the $t_i$ timestamp. Note the training data at each timestamp is $\tilde{X}_i$. In Algorithm 2, $\tilde{x}=\hat{o}$ (a latest, or current, observed data) if v is within the predicted normal range defined by $p_i \pm 3 * \sigma_i$. By using the observed value, the updated training data can adapt to minor trend changes in the observations. If the observed value is out of the predicted range, p+sign(v−p)*$\sigma_i$ is used to update the training data.

Algorithm 2:
$\tilde{X} \leftarrow \{ \}, \tilde{O} \leftarrow \{ \}, P \leftarrow \{ \}$, bDataClean←False
Repeat for each new observation ô = (t ,v):
   Append ô to O
   if bDataClean ≠ True then
     if len ($\tilde{X}$) < N then
       Continue
     else
       $\tilde{X} \leftarrow O$
       Initial clean $\tilde{X}$ using Algorithm 1
       bDataClean ← True
   else
     Build a time-series model using $\tilde{X}$
     Forecast the expected value p and standard deviation σ at time t.
     if v ∈ [p ± 3 * σ] then
       $\tilde{x}$ = (t, v)
     else
       $\tilde{x}$ = (t, p + σ * sign(v − p))
Append $\tilde{x}$ to $\tilde{X}$
Append (t, p) to P Turning to the feedback manager 116, the feedback manager 116 is generally configured to manage feedback related to anomalous data. As described, in accordance with the anomaly detector 114 detecting an anomaly, an anomaly alert is provided, for example to user device 106 for presentation to a user. In cases that a user provides feedback in relation to the anomaly alert, the feedback is received by the feedback manager 116. By way of example only, one example anomaly alert includes a link to be selected by a user if the user believes the indicated anomaly data is erroneous, that is, that the data is actually normal data and not an anomaly. As such, when a user views the specified anomaly data and believes the observed data is accurate (e.g., associated with seasonality), the user selects the feedback link to notify the feedback manager 116. As can be appreciated, such a feedback is generally very simple to perform to avoid tedious interactions required by a user. Further, as the data has been analyzed by the data analysis tool 104, the amount of data to review is substantially less for the user (in comparison to a manual review or labeling of all data).

In cases that the feedback manager 116 receives or otherwise obtains an indication that a data detected as anomalous is in fact normal (not anomalous) as indicated by a user, the feedback manager 116 can modify or update the training data accordingly. In this regard, the feedback manager may replace a corresponding training data value (e.g., a corrected data value) with the observed or raw data value. For example, as previously described, in some cases, when a data value is identified as anomalous, the data value may be corrected to include a corrected data value in the training data set (as opposed to the observed value). Assume now that the feedback manager 116 receives an indication that the designated anomaly value is actually a normal value (e.g., as provided by a user indication or feedback). In such a case, the feedback manager 116 may access the appropriate observed value and replace the corrected data value in the training data set with the observed value.

By way of a specific example, assume a current observed value of 10 at time t is obtained, and a prediction model predicts a predicted value of 5 at time t. Now assume that an observed value outside a lower boundary of 2 and an upper boundary of 8 is designated as an anomaly. In this case, as the observed value of 10 is designated as an anomaly, a corrected value of 6 may be determined (e.g., the predicted value of 5 plus one standard deviation). The corrected value of 6 can be added to the training data set and an alert sent to the user to notify the user of the anomalous observed value of 10 at time t. Now assume the user selects a feedback indicator to indicate that the user believes the observed value of 10 at time t is a normal value (e.g., given a set of circumstances known to the user). In such a case, the corrected value of 6 included in the training data set is replaced with the observed value of 10 at time t. As such, a subsequent update or optimization of the prediction model can take into account the observed value of 10.

Advantageously, using user feedback enables the data analysis tool 104 to avoid the need of a long sequence of historical data for model building. As such, anomaly detection or monitoring can be performed more efficiently. Further, there is minimal burden on a user as one-click feedback for only detected anomalies can be efficiently performed by a user (as opposed to a user analyzing thousands of data points to eliminate outliers). Typically, only a small amount of user feedback may be needed or provided, for example, in cases of sudden trend changes.

As described, the data store 118 may capture observed data, predicted data P, and training data $\tilde{X}$. As described, the training data $\tilde{X}$ is used for model generation, and the predicted data and observed data are maintained, for example, for processing user feedback. For example, when a user clicks or selects a feedback hyperlink indicating a false alarm for the t timestamp, the feedback manager 116 identifies the corresponding observed data and the training data with timestamp t, denoted as $O_t$ and $\tilde{X}_t$, respectively, and then replaces $\tilde{X}_t$ with $O_t$. As such, in a next iteration, a prediction model (e.g., time series prediction model) is generated with $O_t$ included in the training data. Advantageously, subsequent data similar to $O_t$ (e.g., similar value at similar period of time, such as same hour at the day) can be classified as normal. If a false negative feedback is posted for the t timestamp. The $\tilde{X}_t$ is set to $P_t$, such that the user identified anomalous value will be replaced with the expected value.

In some embodiments, the amount of data may be limited. For example, the amount of data stored for each of the observed data O, the predicted data P, and the training data $\tilde{X}$ may be limited. Limiting amounts of data stored in the data store 118 can reduce storage costs and can reduce network traffic when accessing less data. Further, persisting and loading data sequences from a cloud service is non-trivial in time, particularly when the data sequence grows longer (e.g., up to several seconds for a time series of thousands of data points with multiple metrics). Further, model estimation generally takes longer for longer sequences of data. As such, by limiting the amount of stored data, the overhead time is significantly reduced, thereby improving the response time of the data analysis service.

In some embodiments, to limit the amount of data stored, a rolling window of up to a particular number of days D of latest data may be stored. The specific number of days used as a basis for the rolling window may depend on the granularity of the data. For example, a number of days D for data arriving every five minutes (e.g., throughput data) may be 28 days, whereas a number of days D for data arriving hourly (e.g., memory usage data) may be 90 days and a number of days D for data arriving daily (e.g., video analytics data) may be 720 days. Generally, the number of days D may be reduced for data with higher frequencies as they already provide a larger amount of data points within a shorter period of time.

Utilizing feedback processing and a rolling window of stored data, the quality of the training data improves over time. For example, extreme high and low values due to a strong seasonality, if removed by the training data manager, can be added back through the anomaly feedback (e.g., one-click feedback indicator). Further, upon attaining a number of days D of data, the training data set can maintain a fixed length by removing old data points and adding the latest or most recently received data points, which is the expected normal data. As a result, even though an initial training data set may contain outliers, such outliers will be identified and purged and the training data set $\tilde{X}$ will eventually become outlier free. Generally, and as described, for each incoming data, the prediction model is generated using the current training data set $\tilde{X}$. As the training data set $\tilde{X}$ gets cleaner with incoming data, the model quality also improves. Consequently, the predicted value and range become more precise, which in turn help improve the training data. As such, the training data and the model estimation are jointly optimized.

Although generally described herein as an iterative approach (e.g., iteratively update the training data and the model with each incoming data), some implementations may perform embodiments described herein in a batch manner (e.g., collect a longer period of data, identify an optimal model and identify outliers, for example, concurrently).

Figure 3A:
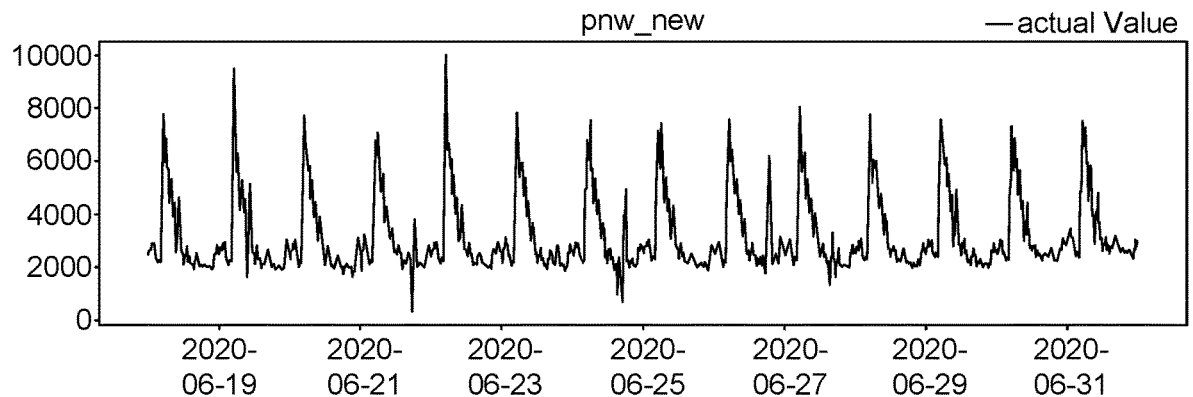
FIGS. 3A-3F provide various graphs depicting data, in accordance with an embodiment of the present disclosure.
Figure 3B:
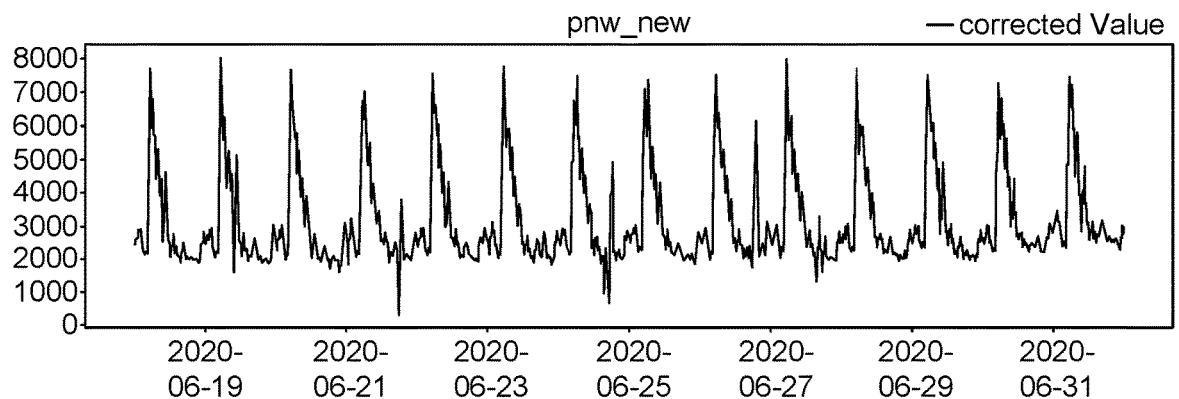
Figure 3C:
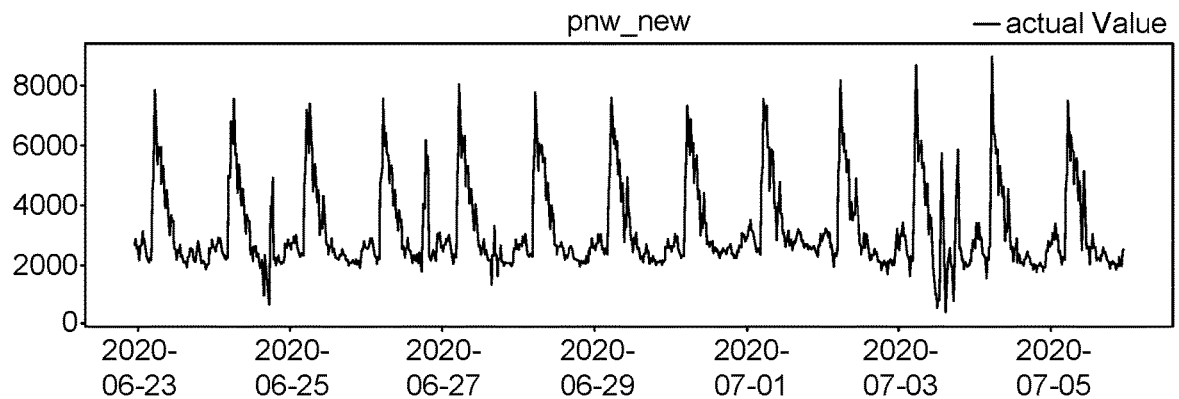
Figure 3D:
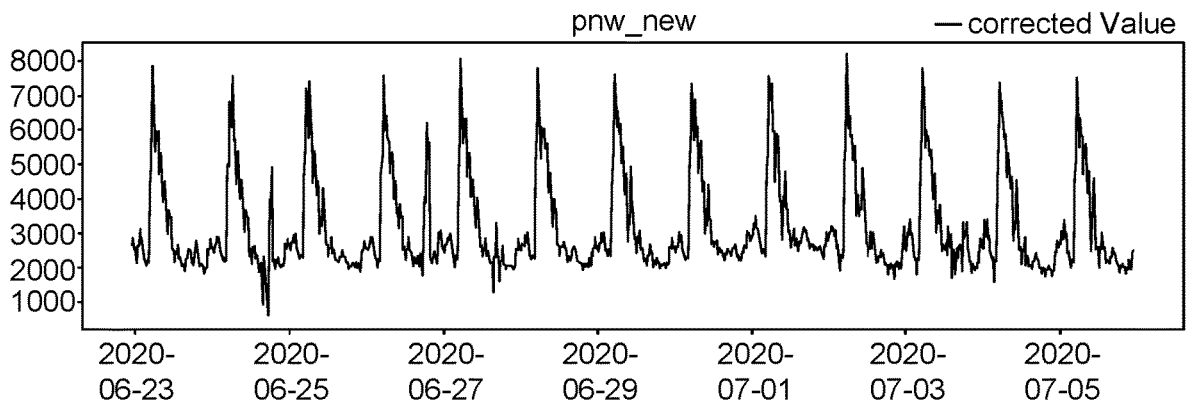
Figure 3E:
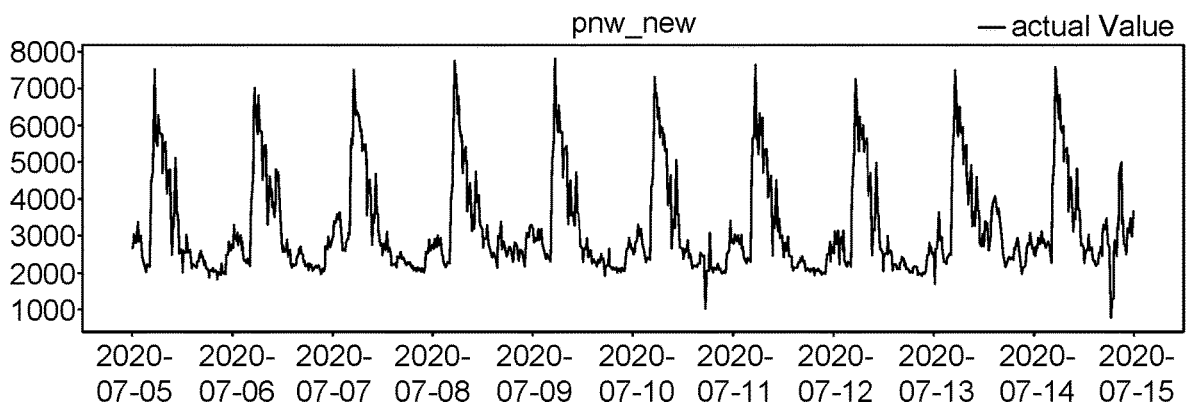
Figure 3F:
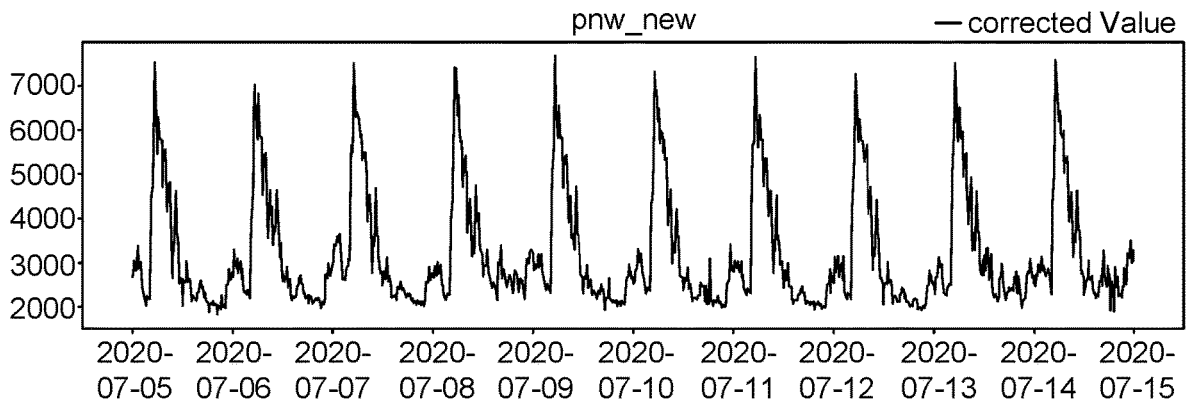

FIGS. 3A-3F provides example graphs illustrating maintaining a rolling window of data. Initially, FIG. 3A illustrates an initial set of observed data occurring within a training window of two weeks. FIG. 3B illustrates a set of training data during the same two week training window. As described, the training data set excludes extreme anomaly values (e.g., as identified via the training data manager 110). Now assume four days have passed. In such a case, the rolling training window shifted four days, and FIG. 3C illustrates the observed data within the shifted rolling window. FIG. 3D illustrates a set of training data during the shifted rolling window. In FIG. 3D, the training data includes updates, such as removal of extreme outliers and correction of detected anomalies. For example, anomalies detected on July $3^{rd}$ are corrected in FIG. 3D as compared to FIG. 3C. Now assume 14 days have lapsed since the initial two-week training window. In such a case, the rolling training window shifted another 10 days, and FIG. 3E illustrates the observed data within the shifted rolling window. FIG. 3F illustrates the updated training data during the new shifted rolling window. In FIG. 3F, the training data includes updates, such as removal of extreme outliers and correction of detected anomalies. The anomalies of the observed data, for example on July 15, in FIG. 3E are corrected in FIG. 3F. As shown, this new two-week training window includes data that appears clean (e.g., outlier free) and, as such, a more accurate model may be generated therefrom. To this end, as a new data point is obtained, a prediction or forecasting model can be generated using the outlier free data.

Figure 4:
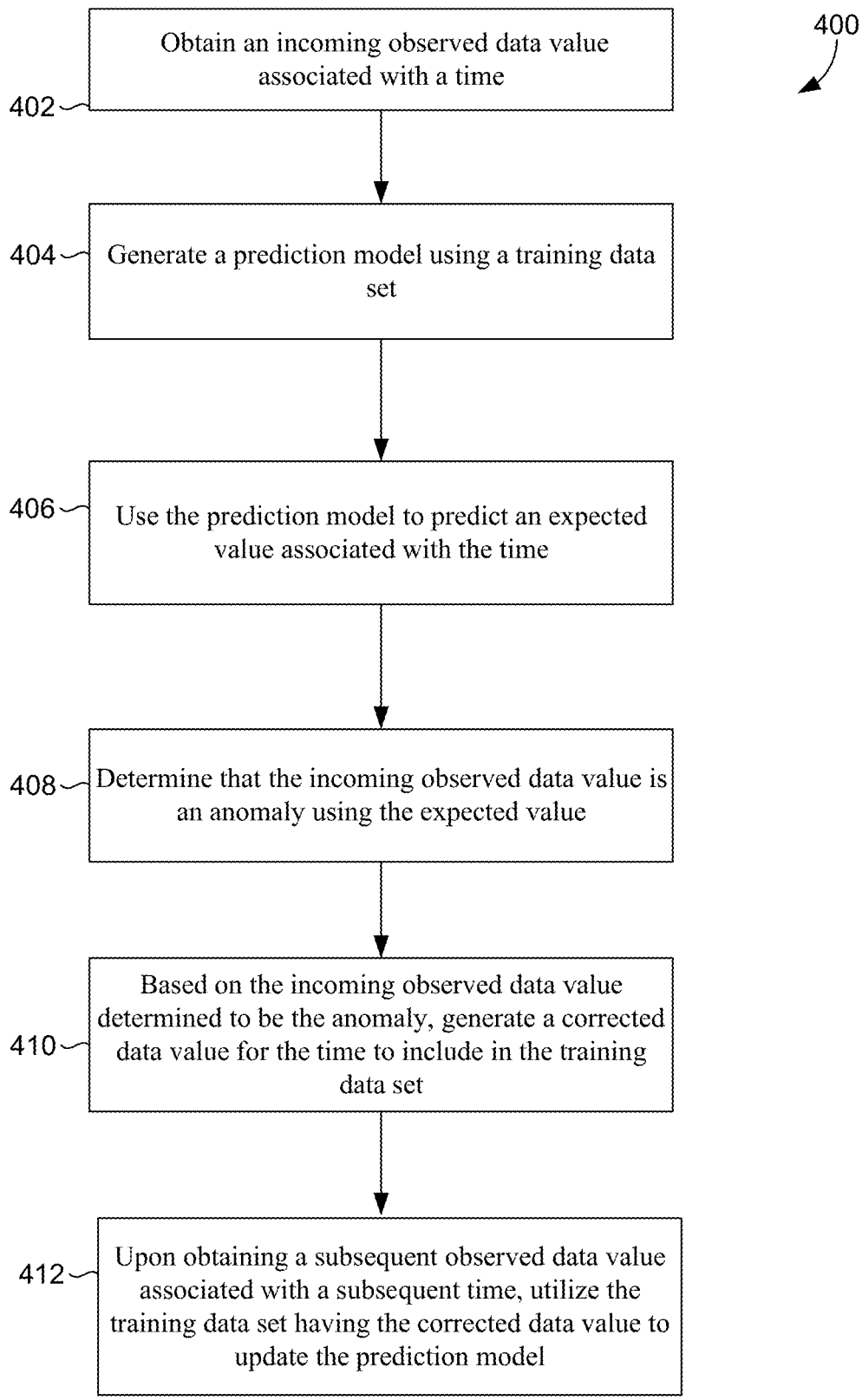
FIG. 4 is a flow diagram showing a method for facilitating anomaly detection, in accordance with an embodiment of the present technology.
Figure 5:
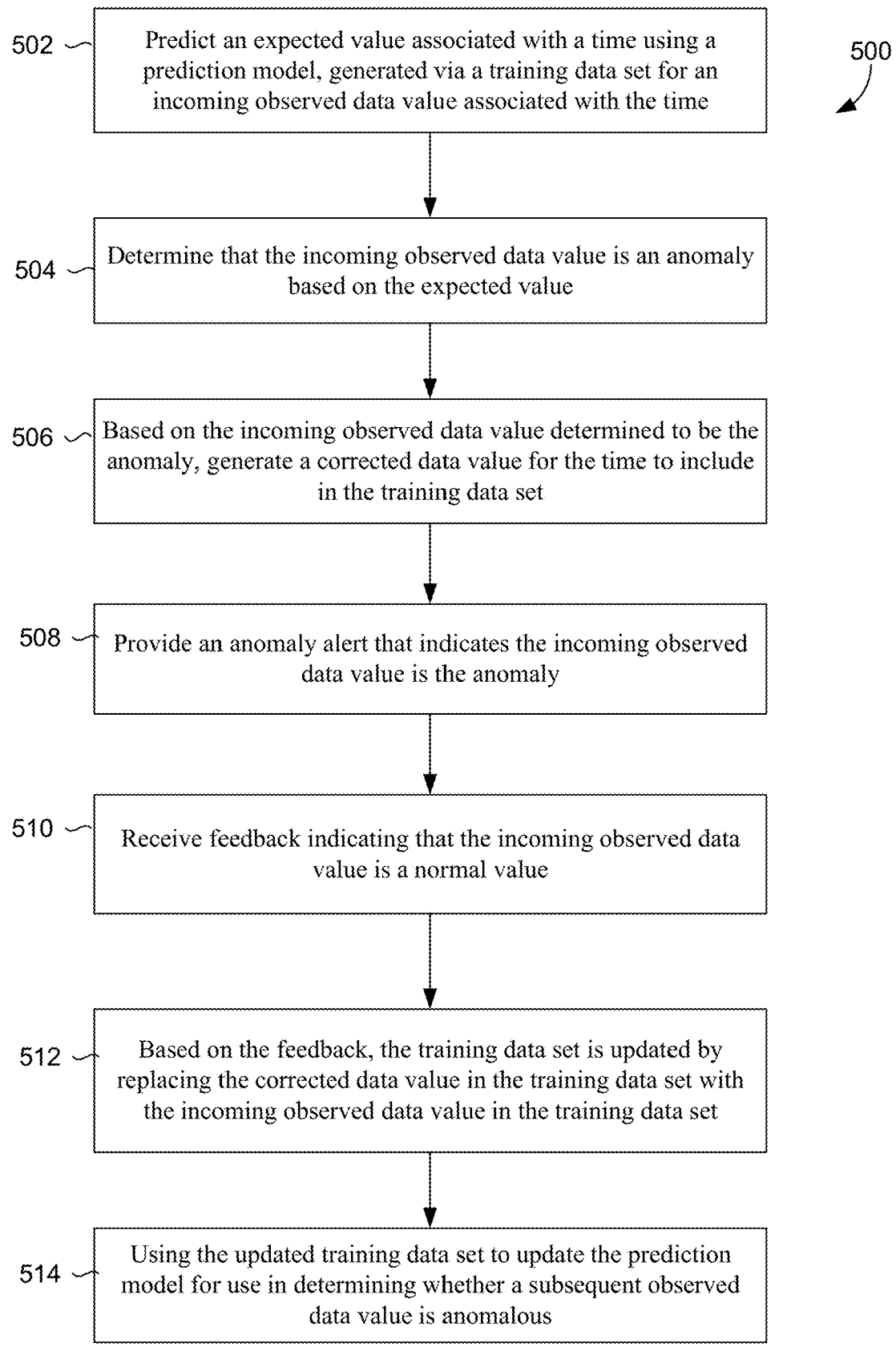
FIG. 5 is a flow diagram showing another method for facilitating anomaly detection in accordance with an embodiment of the present technology.

Turning now to FIGS. 4-5, FIGS. 4 and 5 provide example flow diagrams for facilitating efficient and effective anomaly detection. Initially, FIG. 4 illustrates one method 400 for facilitating anomaly detection. Such a method may be employed, for example, by a data analysis tool, such as data analysis tool 104 of FIG. 1. Initially, as shown at block 402, an incoming observed data value associated with a time is obtained. At block 404, a prediction model is generated using a training data set. In embodiments, before generating the prediction model, the training data set may be analyzed to identify and remove extreme outlier data. At block 406, the prediction model is used to predict an expected value associated with the time. At block 408, the expected value is used to determine that the incoming observed data value is an anomaly. The anomaly may be detected based on the distance between the incoming observed data value and the expected value. For instance, in cases that the incoming observed data value is greater than three standard deviations away from the expected value, the observed data value may be identified as an anomaly. Based on the incoming observed data value determined to be the anomaly, at block 410, a corrected data value for the time is generated to include in the training data set. A corrected data value may be determined to be a value between the incoming observed data value and the predicted value. For instance, the corrected data value may be one standard deviation away from the predicted value in the direction of the incoming observed data value. Upon obtaining a subsequent observed data value associated with a subsequent time, at block 412, the training data set having the corrected data value is used to update the prediction model. The updated prediction model can be used to determine whether the subsequent observed data value is anomalous.

With reference now to FIG. 5, a flow diagram is provided that illustrates another method 500 for facilitating anomaly detection. Such a method may be employed, for example, by a data analysis tool, such as data analysis tool 104 of FIG. 1. Initially, at block, 502, a prediction model, generated via a training data set for an incoming observed data value associated with a time, is used to predict an expected value associated with the time. In embodiments, before generating the prediction model, the training data set may be analyzed to identify and remove extreme outlier data. At block 504, it is determined that the incoming observed data value is an anomaly based on the expected value, for example, as compared to the observed data value. For instance, in cases that the incoming observed data value is greater than three standard deviations away from the expected value, the observed data value may be identified as an anomaly. Based on the incoming observed data value determined to be the anomaly, at block 506, a corrected data value is generated for the time to include in the training data set. A corrected data value may be determined to be a value between the incoming observed data value and the predicted value. For instance, the corrected data value may be one standard deviation away from the predicted value in the direction of the incoming observed data value. Further, at block 508, an anomaly alert is provided that indicates the incoming observed data value is the anomaly. At block 510, feedback is received indicating that the incoming observed data value is a normal value. Based on the feedback, at block 512, the training data set is updated by replacing the corrected data value in the training data set with the incoming observed data value in the training data set. Thereafter, at block 514, the updated training data set is used to update the prediction model for use in determining whether a subsequent observed data value is anomalous. The updated prediction model is generated, trained, or optimized using the updated training data set.

Figure 6:
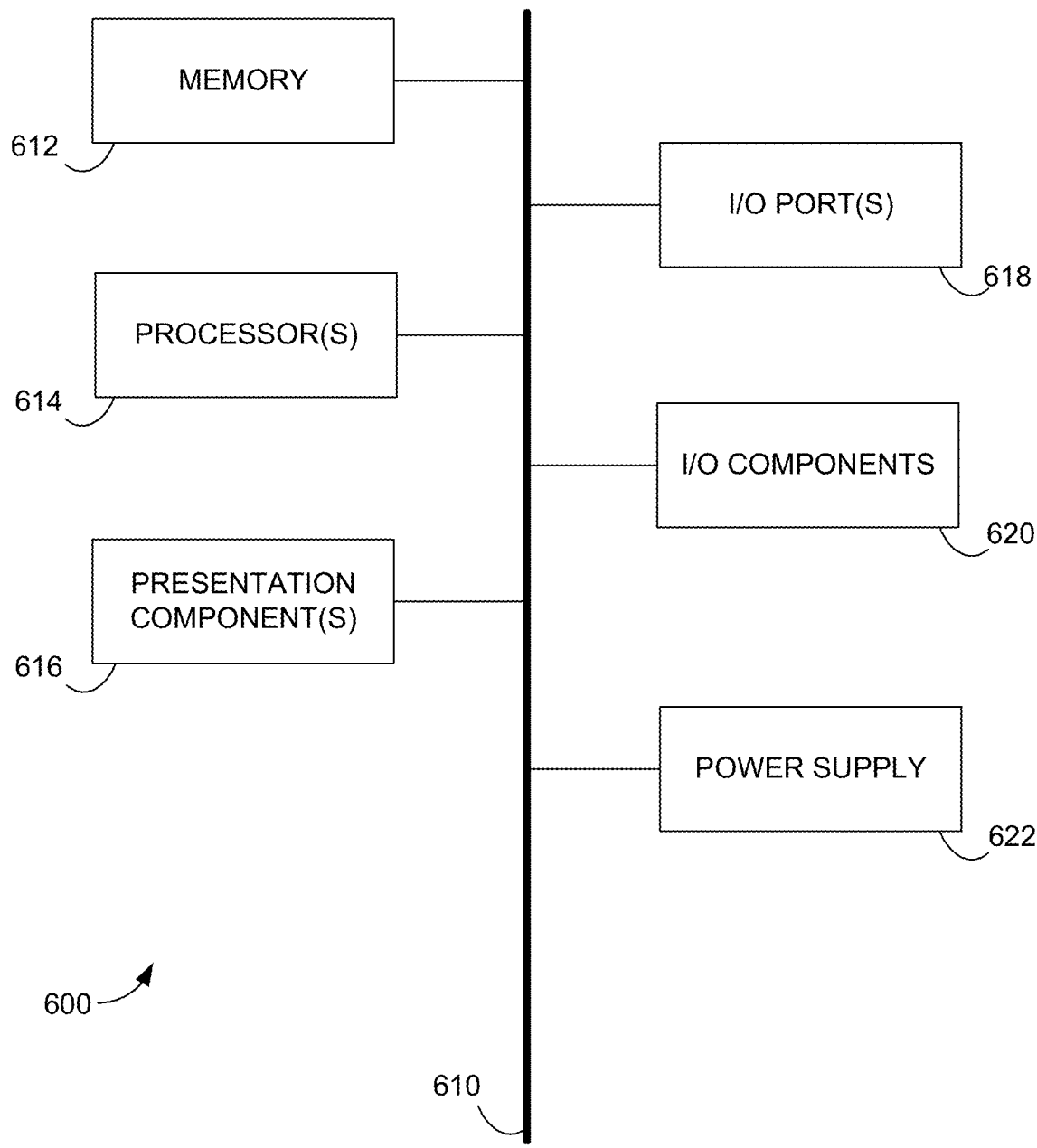
FIG. 6 is a block diagram of an exemplary computing environment suitable for use in implementing embodiments of the present technology.

Having described embodiments of the present technology, an exemplary operating environment in which embodiments of the present technology may be implemented is described below in order to provide a general context for various aspects of the present technology. Referring initially to FIG. 6 in particular, an exemplary operating environment for implementing embodiments of the present technology is shown and designated generally as computing device 600. Computing device 600 is but one example of a suitable computing environment and is not intended to suggest any limitation as to the scope of use or functionality of the present technology. Neither should the computing device 600 be interpreted as having any dependency or requirement relating to any one or combination of components illustrated.

The present technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The present technology may be practiced in a variety of system configurations, including hand-held devices, consumer electronics, general-purpose computers, more specialty computing devices, etc. The present technology may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present technology. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present technology provide for, among other things, generating predictive models. The present technology has been described in relation to particular embodiments, which are intended in all respects to be illustrative rather than restrictive. Alternative embodiments will become apparent to those of ordinary skill in the art to which the present technology pertains without departing from its scope.

From the foregoing, it will be seen that the present technology is well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations to facilitate anomaly detection, the method comprising:
obtaining an incoming observed data value associated with a time;
generating a prediction model using a training data set;

using the prediction model to predict an expected value associated with the time;

using the expected value to determine that the incoming observed data value is an anomaly based on the incoming observed data exceeding a multiple of a standard deviation from the expected value, wherein the standard deviation is determined using a set of observed data values or a set of training data values;

based on the incoming observed data value determined to be the anomaly, generating a corrected data value for the time to include in the training data set, wherein generating the corrected data value for the time comprises adding the standard deviation to the expected value associated with the first time or subtracting the standard deviation from the expected value associated with the time such that the corrected data value is a value between the incoming observed data value and the expected value; and upon obtaining a subsequent observed data value associated with a subsequent time, using the training data set, having the corrected data value associated with the time, to update the prediction model used to determine whether the subsequent observed data value is anomalous.

2. The one or more computer storage media of claim 1, wherein prior to using the training data set to generate the prediction model, analyzing data in the training data set to identify and remove any extreme outliers.

3. The one or more computer storage media of claim 2, wherein the extreme outliers are determined when corresponding data values exceed a second multiple of the standard deviation from a mean of the data in the training data set.

4. The one or more computer storage media of claim 1, wherein the updated prediction model is used to determine whether the subsequent observed data value is anomalous by:

predicting a subsequent expected value associated with the subsequent time; and using the subsequent expected value to determine that the subsequent observed data value is the anomaly.

5. A method to facilitate anomaly detection, the method comprising:

using a prediction model, generated via a training data setfor an incoming observed data value associated with a time, to predict an expected value associated with the time, the training data set based on a rolling window of a fixed length;

determining that the incoming observed data value is an anomaly based on the expected value;

based on the incoming observed data value determined to be the anomaly, generating a corrected data value for the time to include in the training data set and providing an anomaly alert that indicates the incoming observed data value is the anomaly;

receiving an anomaly feedback indicating that the incoming observed data value is a normal value;

based on the anomaly feedback, updating the training data set, having the corrected data value, by replacing the corrected data value in the training data set with the incoming observed data value in the training data set, the updated training data set maintaining the fixed length of the rolling window by removing older data points and adding most recently obtained data points; and using the updated training data set to update the prediction model for use in determining whether a subsequent observed data value is anomalous.

6. The method of claim 5, wherein prior to using the training data set to generate the prediction model, analyzing data in the training data set to identify and remove any extreme outliers.

7. The method of claim 5, wherein the incoming observed data value is compared to the expected value to determine that the incoming observed data value is the anomaly.

8. The method of claim 5, wherein the anomaly alert includes a link that, if select, provides feedback indicating that the incoming observed data value is normal.

9. The method of claim 5, wherein generating the corrected data value for the time includes correcting the incoming observed data value to be a value between the incoming observed data value and the expected value.

10. The method of claim 8, wherein the corrected data value is appended in the training data set.

11. A system comprising:

one or more processors; and one or more computer storage media storing computer-useable instructions that, when used by the one or more processors, cause the one or more processors to:

using a prediction model, generated via a training data set for an incoming observed data value associated with a time, to predict an expected value associated with the time;

determining that the incoming observed data value is an anomaly based on the incoming observed data exceeding a multiple of a standard deviation from the expected value, wherein the standard deviation is determined using a set of observed data values or a set of training data values;

based on the incoming observed data value determined to be the anomaly, generating a corrected data value for the time to include in the training data set, wherein generating the corrected data value for the time comprises adding the standard deviation to the expected value associated with the first time or subtracting the standard deviation from the expected value associated with the time such that the corrected data value for the time is a value between the incoming observed data value and the expected value; and upon obtaining a subsequent observed data value associated with a subsequent time, using the training data set, having the corrected data value associated with the time, to update the prediction model used to determine whether the subsequent observed data value is anomalous.

12. The system of claim 11, wherein the prediction model comprises a time series prediction model.

13. The system of claim 11, further comprising:

providing an anomaly alert indicating the incoming observed data value is anomalous;

receiving a feedback indicating the incoming observed data value is not anomalous; and based on the feedback, updating the training data set by replacing the corrected data value in the training data set with the incoming observed data value in the training data set.

14. The system of claim 11 further comprising:

obtaining another subsequent observed data value; and using the updated training data set to further update the prediction model used to determine whether the another subsequent observed data value is anomalous.

15. The system of claim 11, wherein the incoming observed data value is compared to the expected value to determine that the incoming observed data value is the anomaly.

* * * * *